Patented Apr. 28, 1936

2,038,591

UNITED STATES PATENT OFFICE 2,038,591

PRINTING PASTE

William R. Moorhouse, New York, N. Y., assignor to National Aniline & Chemical Company, Inc., New York, N. Y., a corporation of New York No Drawing. Application April 12, 1930, Serial No. 443,918

15 Claims. (Cl. 8—6)

The present invention relates to the production of a vat dyestuff paste for use in printing black shades, more particularly to a vat dyestuff paste prepared from Carbanthrene Black B (Color Index No. 1102), to the use of the same in printing, and to material printed therewith.

Vat dyestuff pastes for use in printing black shades appear in commerce usually as aqueous pastes composed of a mixture of two or more insoluble vat dyes in dispersed condition, and of other ingredients such as thinning or dispersing agents. Such pastes have the inherent disadvantage that the components are not influenced to the same visible extent by all color destroying agents, such as light, bleaching, etc. The consequence is that textiles printed with such a mixture not only lose their strength of color in service but also change shade as sunlight, bleaching, washing, etc., unequally exert their influence on the component dyes.

It is known that black dyeings can be produced on textile materials with a nitrodibenzanthrone vat dye, namely Indanthrone Green B, (Schultz No. 765) by reducing the dye in a hydrosulfite vat to form the corresponding leuco aminodibenzanthrone, applying the dye in its reduced state to the fibre, fixing the dye on the fibre by treatment with a vat leuco oxidizing agent to convert the enol oxygen of the leuco compound to the keto form, all in the same manner in which other vat dyes are dyed on the fibre, and developing the black color on the fibre by treatment with an oxidizing developer. (See U. S. P. 1,464,598; and German Patent 226,215.) The term oxidizing developer as used above, and as hereinafter used in the specification and claims, comprises reagents which develop the black color on the fibre, such as, sodium hypochlorite, nitrous acid, sodium bichromate, sodium persulfate, etc. Substantially the same results have been obtained by first reducing the nitrodibenzanthrone with sodium sulfide or other suitable reducing agent, and then following the procedure above specified (U. S. P. 796,393).

The present invention has for one of its objects the provision of a vat dye printing paste which contains a single dye component, and produces black prints.

Another object of the invention is the production of a black printing non-drying vat dye paste.

Still another object of the invention is the production of black vat dye prints which will not change shade in service.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure. The scope of the invention will be indicated in the claims.

According to one feature of the present invention a black dibenzanthrone dyestuff, which will be referred to hereinafter in the specification and claims as Carbanthrene Black BB, is made into a paste by incorporation with an assistant which comprises a compound included in the group consisting of the ethanolamines and the hydroxyalkyl ethers. Carbanthrene Black BB as referred to in this application is the black dyestuff which is obtainable by oxidizing aminodibenzanthrone in aqueous suspension with an oxidizing developer. Among the hydroxyalkyl ethers suitable for incorporation with the black dyestuff for the production of a paste are the di- (hydroxyalkyl) ethers, particularly the di- (hydroxyalkyl) mono ethers, such as, diethylene glycol (HO—$CH_2.CH_2$—O—$CH_2.CH_2$—OH), dipropylene glycol (HO—$(CH_2)_3$—O—$(CH_2)_3$—OH), dibutylene glycol (HO—$(CH_2)_4$—O—$(CH_2)_4$—OH), etc. Suitable ethanolamines are monoethanolamine, diethanolamine, triethanolamine or mixtures thereof. In addition to the black dyestuff and assistant as above defined, the paste may contain water, a dispersing agent and such other ingredients as are normally employed in making dye pastes. Suitable dispersing agents which may be employed are "Leukanol" (a condensation product of formaldehyde with naphthalene sulfonic acid), "Binderine" (concentrated sulfite-cellulose waste liquor), or "Nekal A" (an isopropyl-naphthalene-sulfonic acid). Such a paste does not settle, does not freeze even at winter temperatures, and does not dry out on standing exposed to the air.

According to another feature of the present invention, Carbanthrene Black BB is printed on the fibre in the form of a printing paste containing it, a hydroxyalkyl ether or an ethanolamine, as previously specified, and such additional assistants as are generally employed in printing with vat dyes; is reduced to the leuco form in which form it penetrates the fibre; and is fixed on the fibre by treatment with a vat leuco oxidizing agent whereby the enol oxygen of the leuco compound is converted to the keto form. The additional assistants which may be used in the printing paste are those generally employed in printing with vat dyes, such as a reducing agent, an alkali, a thickener, etc. The reduction of the dye in the printing paste and its penetration of the fibre are accomplished by steaming the fibre imprinted with the above described printing paste, in the same manner in which other vat dyes are reduced and made to penetrate the fibre in printing; and the fixing on the fibre is accomplished by oxidizing with air or other vat leuco oxidizing agent, in the same manner in which other vat dyes are fixed on the fibre in printing, as is well understood in the art.

The aminodibenzanthrone employed for making the Carbanthrene Black BB may be produced by nitrating dibenzanthrone, isolating the nitrodibenzanthrone, and reducing the same by treatment with sodium sulfide, as disclosed in U. S. P. 796,393, or it may be prepared by dissolving the nitrodibenzanthrone in alkaline sodium hydrosulfite and aerating the solution. In dissolving in alkaline sodium hydrosulfite, nitrodibenzanthrone is probably reduced to the leuco aminodibenzanthrone, and upon aeration of the solution, the enol oxygen of the leuco compound is apparently converted to the keto form, producing aminodibenzanthrone which precipitates. A satisfactory black dyeing cannot be made by reducing nitrodibenzanthrone in a hydrosulfite vat to form the leuco compound, converting the enol oxygen of the leuco compound to the keto form in suspension, treating the resulting dye in suspension with an oxidizing developer to produce the black dyestuff, isolating the black dyestuff, then vatting the black dye in an alkaline hydrosulfite vat and applying it to the fibre, as in dyeing with other vat dyes.

As illustrative embodiments of a manner in which the invention may be carried into practice and of the products produced, the following examples are presented: The parts are by weight.

*Example A.—Dye paste*

5.8 parts of Carbanthrene Black B double paste (Color Index No. 1102), equivalent to about 1.05 parts Carbanthrene Black B powder, and containing about 0.16 per cent. "Leukanol" on the basis of the Carbanthrene Black B present are dissolved and simultaneously reduced to the amino-leuco compound at a temperature of about 50° C. in 150 parts water, 1.5 parts caustic soda and 0.5 part sodium hydrosulfite. The solution is then aerated to convert the enol oxygen to the keto form. The resulting suspension is made slightly acid to Congo red, about 1.5 parts sulfuric acid being required and sufficient sodium nitrite is added at 30° C. with agitation until after two hours a positive nitrous acid test is obtained, about 1 part of sodium nitrite being required. The Carbanthrene Black BB so produced and in suspension is then filtered, washed until substantially acid free and the press cake is mixed with about 3.7 parts of diethylene glycol. The mixture is then evaporated on the water bath to a weight of about 5.8 parts. A dyestuff paste containing about 18 per cent. black dye is produced. Pastes so prepared contain water and diethylene glycol in the ratio of about one part of water to about four parts of diethylene glycol.

In the foregoing example, the oxidation may be performed with other oxidizing developers, such as, calcium hypochlorite, sodium bichromate, or sodium persulfate, etc.

*Example B.—Printing Paste*

30 parts of a paste, prepared according to the above Example A, are mixed with 20 parts of British Gum powder and 46 parts water. 20 parts potassium carbonate are added and the mixture is heated to about 170° F. until the potassium carbonate and gum are dissolved. The mixture is then cooled to about 140° F. at which temperature 10 parts sodium sulfoxylate formaldehyde are added. 126 parts of printing paste is thus produced.

The fibres or fabrics upon which the printing pastes of the present invention have been applied, have imprinted thereon, before reduction of the dyestuff to the leuco form by steaming, a paste comprising the black vat dyestuff (Carbanthrene Black BB) and the assistant comprising the hydroxyalkyl ethers or ethanolamines, as well as such additional assistants as may be employed. In the subsequent operations of washing and soaping, the hydroxyalkyl ether or ethanolamine, and other assistants are removed.

Prints made from printing pastes containing the above defined hydroxyalkyl ethers or ethanolamines and Carbanthrene Black BB as described above, show satisfactory strength and shade and sufficient penetration of the color. The prints are also conspicuous for the absence of specks in the printed portion and clearness of outline and even distribution of color in the design.

The amount of dyestuff in the paste may be varied from the compositions above described in order to produce dyeings of different strengths, as is well understood in the art. Also, it will be understood that the invention is not limited with respect to other ingredients which may be used in the pastes along with the dyestuff and hydroxyalkyl ether or ethanolamine, and that the pastes may be compounded in any other convenient manner. The invention, furthermore, comprises fabrics and other materials imprinted with the dye pastes prepared by the process above set forth.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A dye paste for use in printing with the aid of a reducing agent and an alkali comprising Carbanthrene Black BB and an assistant selected from the group consisting of the ethanolamines and the hydroxyalkyl ethers.

2. A dye paste comprising Carbanthrene Black BB and a hydroxyalkyl ether.

3. A dye paste comprising Carbanthrene Black BB and a di- (hydroxyalkyl) ether.

4. A dye paste comprising Carbanthrene Black BB and a di- (hydroxyalkyl) mono ether.

5. A dye paste comprising Carbanthrene Black BB and diethylene glycol.

6. A dye paste comprising Carbanthrene Black BB admixed with diethylene glycol and water in the ratio of about one part of water to about four parts of diethylene glycol.

7. A dye paste for use in printing with the aid of a reducing agent and an alkali comprising Carbanthrene Black BB, a dispersing agent, and an assistant selected from the group consisting of the ethanolamines and the hydroxyalkyl ethers.

8. A dye paste comprising Carbanthrene Black BB, diethylene glycol, and a dispersing agent.

9. A dye paste comprising Carbanthrene Black BB, a dispersing agent, and diethylene glycol and water in the ratio of about one part of water to about four parts of diethylene glycol.

10. A printing paste comprising Carbanthrene Black BB, an assistant selected from the group consisting of the ethanolamines and the hydroxyalkyl ethers, a reducing agent, an alkali and an adhesive.

11. A printing paste comprising Carbanthrene Black BB, diethylene glycol, a reducing agent, and an adhesive.

12. A printing paste comprising Carbanthrene Black BB, a hydroxy alkyl ether, a dispersing agent, a reducing agent, and an adhesive.

13. The method of printing textile material which comprises applying to the material a printing paste comprising the product specified in claim 1 admixed with a reducing agent, an alkali, and an adhesive.

14. The method of printing textile material which comprises applying to the material a printing paste comprising the product specified in claim 3 admixed with a reducing agent and an adhesive.

15. The method of printing textile material which comprises applying to the material the printing paste comprising the product specified in claim 5 admixed with a reducing agent and an adhesive.

WILLIAM R. MOORHOUSE.